UNITED STATES PATENT OFFICE.

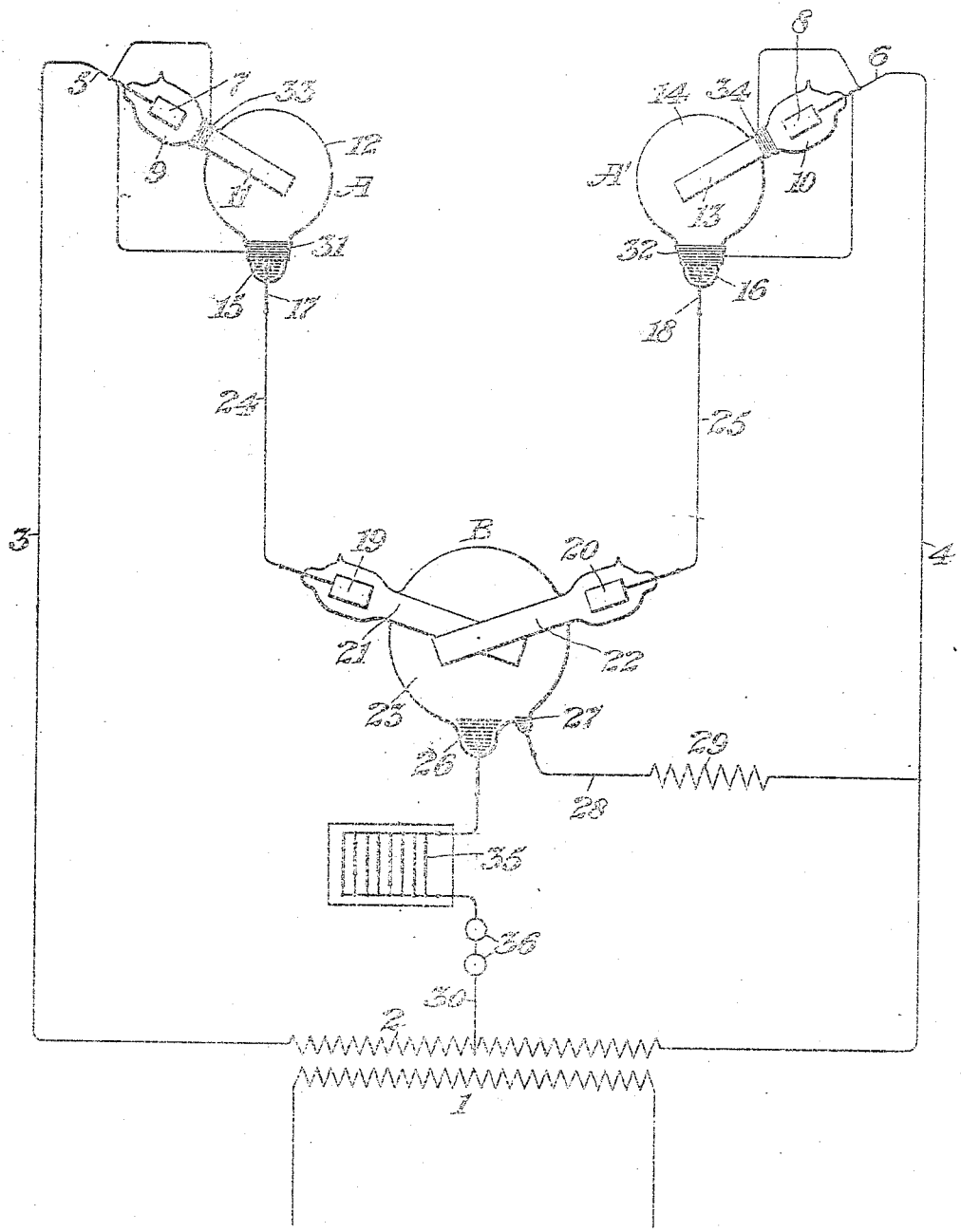

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

HIGH-TENSION CONVERTER SYSTEM.

1,161,820. Specification of Letters Patent. Patented Nov. 23, 1915.

Original application filed March 14, 1906, Serial No. 305,990. Divided and this application filed August 23, 1909. Serial No. 514,331.

*To all whom it may concern:*

Be it known that I, PETER COOPER HEWITT, a citizen of the United States, and resident of Ringwood Manor, county of Passaic, State of New Jersey, have invented certain new and useful Improvements in High-Tension Converter Systems, of which the following is a specification.

In supplying the need for high tension vapor converters, recourse has been had to a number of expedients, some of which, among others, are described and illustrated in applications for Letters Patent of the United States filed by me on the 11th day of January, 1906, Serial Numbers 293,537 and 295,538.

The present invention aims at a different embodiment of apparatus for serving as a high tension converter and in some respects the present apparatus possesses advantages which are different from those set forth in the applications named.

The invention is illustrated in the accompanying drawing, which besides containing a diagram of suitable electrical circuits also shows with some detail of construction the vapor converters which I may employ in connection with the said system of circuits.

In the drawing 1 is the primary of a transformer, the terminals of this primary being joined to a suitable source of alternating current.

2 is the secondary of the said transformers and its terminals are joined by conductors 3 and 4 to leads 5 and 6, the former of which is joined to a positive electrode 7 inside a chamber 9 and the latter of which is joined to a positive 8 inside a chamber 10. The chamber 9 is formed on a tubular element, 11, the inner extremity of which ends within an exhausted chamber or globe, 12, while the chamber 10 is merely connected with a tubular element 13, terminating inside an exhausted globe or chamber 14. The entire apparatus represented by the elements 9, 11 and 12, is exhausted to a high degree of vacuum and the same is true of the apparatus represented by the elements 10, 13 and 14.

The electrodes 7 and 8 are positive electrodes, say, of iron or some other solid conducting material. At the bottom of the chamber 12 is formed a pocket in which an electrode 15 of mercury or other conducting liquid is placed and at the lower end of the chamber 14 a similar pocket is formed containing a similar electrode 16.

Leads 17 and 18 extend respectively, from the electrodes 15 and 16 to solid positive electrodes 19 and 20 contained in tubular elements 21 and 22 terminating inside an exhausted globe or chamber 23. In the circuit between the lead 17 and the electrode 19 an impedance 24 may be usually inserted and similarly an impedance 25 is generally placed in the circuit between the lead 18 and the positive electrode 20.

The globe or chamber 23 is provided with a pocket containing a negative electrode 26, usually of mercury and it is also provided with a pocket adapted to contain a supplemental positive electrode 27 joined to one side of the circuit by a conductor 28 through a resistance 29.

The electrode 26 is joined through a work circuit 30 containing inductance and resistance to an intermediate point in the secondary 2 of the transformer 1—2. It will be convenient to secure the globe or chamber 12 and the parts associated therewith as a single converter or preferably as a "check valve". The same term, it will be convenient to apply to the globe or chamber 14 and the parts intimately associated therewith. At the same time, the globe 23 and its connected parts may conveniently be called a vapor converter. In any case, it will be observed that the well-known valve action of the positive electrodes in the check valve 12 is placed in series with the similar action taking place in the converter 23; the same being true as related to the check valve 14 and the converter 23.

It will further be observed that the several positive electrodes are screened from each other and from the corresponding negative electrodes for electrical reasons existing within the device so as to render it more perfect in operation.

The converter 23 may be started by the well-known tilting method or in any other preferred way, while the check valves 12 and 14 may be self-starting on the potential of the line.

To assist in the starting of the last named devices I may employ starting bands 31 and 32 each being suitably connected to the leads of the respective check valves. At the same time, bands 33 and 34 placed outside the tubes 11 and 13 in the neighborhood of the positive electrodes 7 and 8 may be utilized to strengthen the valve action of the said positive electrodes.

The translating devices in the work circuit may be represented by a storage battery 35, lamps 36, 36, or any other suitable devices.

This application is a division of my application Serial Number 305,990, filed March 14th, 1906.

I claim as my invention:

1. A mercury vapor rectifier comprising a main exhausted container, a cathode therein, an external chamber containing an anode connected to said main chamber by a throat portion, and a metallic band outside said throat portion connected to the lead of said anode.

2. A mercury vapor rectifier comprising a main exhausted container, a cathode therein, an external chamber containing an anode connected to said main chamber by a throat portion, and a metallic band outside said throat portion connected to the lead of said anode, and a starting band connected about said cathode and also connected to said anode.

3. A mercury vapor rectifier comprising a main exhausted chamber with a cathode therein, an external chamber connected therewith containing an anode and electrical means external to said chamber operating between them for protecting said anode.

Signed at New York, in the county of New York and State of New York this 13th day of August, A. D. 1909.

PETER COOPER HEWITT.

Witnesses:
WM. H. CAPEL,
HARVEY T. MILLER.